US008974102B2

(12) United States Patent
Paine et al.

(10) Patent No.: US 8,974,102 B2
(45) Date of Patent: Mar. 10, 2015

(54) VEHICULAR LIGHTING SYSTEM

(71) Applicant: Weekend Concepts, Inc., Paso Robles, CA (US)

(72) Inventors: Ryan T Paine, Paso Robles, CA (US); Ronald P Scott, Paso Robles, CA (US); Lyle P Scott, Whittier, CA (US); Dennis M Lusardi, Paso Robles, CA (US)

(73) Assignee: Weekend Concepts, Inc., Paso Robles, CA (US)

( * ) Notice: Subject to any disclaimer, the term of this patent is extended or adjusted under 35 U.S.C. 154(b) by 0 days.

(21) Appl. No.: 13/842,411

(22) Filed: Mar. 15, 2013

(65) Prior Publication Data

US 2014/0268746 A1 Sep. 18, 2014

(51) Int. Cl.
| | |
|---|---|
| *F21V 29/00* | (2006.01) |
| *B60Q 1/00* | (2006.01) |
| *F21V 15/01* | (2006.01) |
| *F21V 21/30* | (2006.01) |
| *F21V 23/04* | (2006.01) |
| *F21Y 101/02* | (2006.01) |

(52) U.S. Cl.
CPC ............... *B60Q 1/00* (2013.01); *F21V 15/013* (2013.01); *F21V 21/30* (2013.01); *F21V 23/04* (2013.01); *F21Y 2101/02* (2013.01)
USPC ......................................... 362/544; 362/235

(58) Field of Classification Search
CPC ... F21Y 2101/02; F21V 29/004; F21V 15/01; F21V 15/013; F21V 21/30; F21V 23/04; B60Q 1/2607; B60Q 1/00
USPC ......... 362/508, 512, 514, 515, 523, 528, 543, 362/544, 545, 235, 236, 240, 249.05, 362/249.01, 362, 368, 370, 371, 457, 37, 362/217.12, 217.13
See application file for complete search history.

(56) References Cited

U.S. PATENT DOCUMENTS

| | | | |
|---|---|---|---|
| 7,106,185 B1 * | 9/2006 | Neufeglise ................... 340/468 |
| 8,277,077 B2 | 10/2012 | Georgitsis et al. |
| 2003/0137835 A1 * | 7/2003 | Mier-Langner et al. ....... 362/220 |
| 2003/0185014 A1 * | 10/2003 | Gloisten ........................ 362/372 |
| 2003/0223233 A1 * | 12/2003 | Calzaretta et al. ............ 362/219 |
| 2007/0127244 A1 * | 6/2007 | Cunius .......................... 362/260 |
| 2008/0089071 A1 * | 4/2008 | Wang ............................ 362/294 |
| 2009/0296381 A1 * | 12/2009 | Dubord ......................... 362/218 |
| 2010/0295468 A1 * | 11/2010 | Pedersen et al. ............. 315/294 |
| 2011/0194287 A1 * | 8/2011 | Georgitsis et al. ............ 362/277 |
| 2014/0043812 A1 * | 2/2014 | Moreau et al. ................ 362/240 |

* cited by examiner

*Primary Examiner* — Anh Mai
*Assistant Examiner* — Glenn Zimmerman
(74) *Attorney, Agent, or Firm* — Fitch, Even, Tabin & Flannery LLP

(57) ABSTRACT

A housing having an extrusion forming a first channel and a second channel; a lighting system in the first channel adapted to direct light away from the first channel; a mounting system in the second channel adapted to couple the extrusion to a vehicle; a first end cap including a first connector, the first end cap being coupled to a first end of the extrusion; a second end cap including a second connector, the second end cap being coupled to a second end of the extrusion; wherein the first connector and the second connector are electrically coupled to one another, and wherein the first connector and the second connector are electrically coupled to the lighting system.

12 Claims, 4 Drawing Sheets

VEHICULAR LIGHTING SYSTEM

BACKGROUND OF THE INVENTION

1. Field of the Invention

The present invention relates generally to providing auxiliary lighting systems. More particularly, this invention relates to auxiliary lighting systems for mobile platforms with an integral mounting system.

2. Discussion of the Related Art

A mounted auxiliary light typically consists of one or more light sources in a protective housing. The light sources may be of various types, for example light-emitting diode (LED), high-intensity discharge (HID) or halogen. The protective housing comes with or is configured for a mounting system that allows the external mounted light to be secured to a base. The auxiliary light is typically powered by a wired connection to a battery, for example a vehicle battery.

A mounted auxiliary light is commonly used where the operator of a vehicle requires additional lighting beyond ambient lighting and lighting provided by the vehicle. For example, an off-road vehicle in a location with no exterior lights may require more lighting than that provided by the vehicle's headlights. The auxiliary light may be used in conjunction with, for example, vehicles, aircraft, watercraft, motorcycles, trailers and commercial equipment. The auxiliary light may also be used in a stationary location, for example, in an architectural use.

A mounted auxiliary light may be mounted to a portion of a vehicle or other structure. Because of the variance of structures and mounting locations, it is often desirable to have an adaptable mounting system which accommodates varying mounting locations and allows the external mounted light to rotate about one or more axes.

The user of a mounted auxiliary light may require a cover to, for example, protect the light or change the type of light emitted. Covers may be made of, for example, fabric or plastic and may be transparent or opaque.

SUMMARY OF THE INVENTION

Several embodiments of the invention advantageously address the needs above as well as other needs by providing an auxiliary lighting systems for mobile platforms with an integral mounting system.

In one embodiment, the invention can be characterized as a housing comprising an extrusion forming a first channel and a second channel; a lighting system in the first channel adapted to direct light away from the first channel; a mounting system in the second channel adapted to couple the extrusion to a vehicle; a first end cap including a first connector, the first end cap being coupled to a first end of the extrusion; a second end cap including a second connector, the second end cap being coupled to a second end of the extrusion; wherein the first connector and the second connector are electrically coupled to one another, and wherein the first connector and the second connector are electrically coupled to the lighting system.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
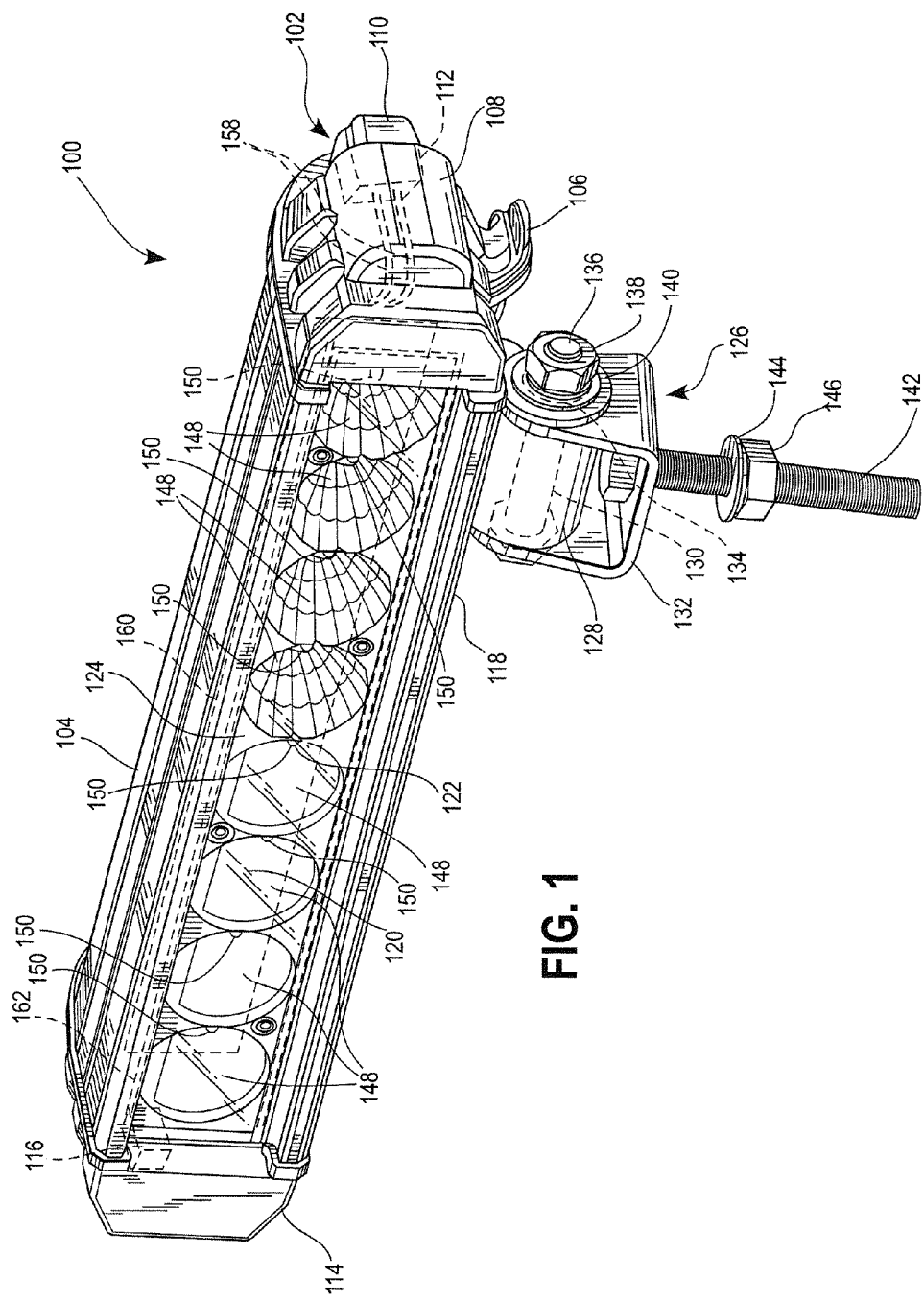
FIG. 1 is a perspective view of the front of the light bar system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a perspective view of a light bar system 100 according to one embodiment of the present invention is shown. Shown is a light bar assembly 102, including a center housing 104, an adjustment track 106, a right end cap 108, a power source wiring 110, a right receptacle 112, a left end cap 114, a left receptacle 116, a front cap 118, a front lens 120, a light-emitting diode (LED) array 122 (comprised of a plurality of LED lights 150), and a reflector array 124 (comprised of a plurality of reflectors 148). Also shown is a mounting assembly 126, including an adjustment bracket 128, an adjustment bracket hole 130, a clevis 132, a plurality of clevis holes 134, a pivot bolt 136, a pivot nut 138, a pivot washer 140, a mounting bolt 142, a mounting washer 144, a mounting nut 146, an internal wiring system 158, a PC board, a gasket 160, and a PC board 162. The center housing 104 is a channel-shape, with the top and bottom of the channel forming the top and bottom of the light bar assembly 102. It is made of extruded metal or other suitable material. In one embodiment, the center housing 104 is approximately 2-3 inches high and 3-5 inches deep. The length of the center housing 104 varies with the embodiment of the invention, but in the preferred embodiment generally varies between 6 inches and 52 inches. The back of the center housing 104 is curved and incorporates a plurality of horizontal fins. At the top and bottom of the center housing 104 are longitudinal indentations approximately ⅛" wide and ⅛" deep which may be used to couple an external light cover to the light bar assembly 102. At the bottom of the back of the center housing 104, two continuous curved horizontal ridges protrude from the center housing 104, forming the adjustment track 106. The front portion of the center housing 104 is shaped to hold and support the reflector array 124, the LED array 122, front lens 120 and the internal wiring system 158. The gasket 162 is formed by machine and completely circles the outer edge of the front lens 120 where the inside facing outer portion of the front lens 120 lens meets with an continuous interior indentation of the light bar assembly 102.

The reflector array 124 size varies depending on the light bar variations. In general, there are one or more reflectors 148 in a row in the reflector array 124. FIG. 1 represents an embodiment of the invention with eight reflectors 148 in a row. Each reflector 148 has a curved conical shape and is connected at the wide end by a flat portion of the reflector array 124, similar to the construction of an egg carton. In one embodiment, there are two horizontal reflector 148 rows stacked on top of one another. FIG. 1 represents an embodiment of the invention with a single row in the reflector array 124. The LED light 150 is coupled to the PC board 160 and positioned so that the LED light 150 extends through a small hole in the narrow end of the reflector 148. The grouping of the LED lights 150 forms the LED array 122. In front of the reflector array 124, a thin transparent front lens 120, made of polycarbonate or other suitable material, covers the reflector array 124. The front lens 120 is transparent so as not to affect the photometrics of the reflectors 148. The reflector array 124 is coupled to the PC board 160 by screws or other suitable method. The front lens 120 is coupled to the front cap 118 which frames the front lens 120 and is coupled to the top and bottom of the center housing 104, to the left end cap 114 on the left, and the right end cap 108 on the right. The reflectors 148 in the reflector array 124 may all be of the same type, for example, spot reflectors, or a combination of types of reflectors may be used. For example, the reflector array 124 may consist of a combination of flood and spot reflectors. This allows for a variety of photometric requirements to be satisfied. The right end cap 108 covers and seals the interior of the light bar assembly 102 on the right-hand side. The right end cap 108 contains the right receptacle 112 and, in one embodiment, the power source wiring 110. In another embodiment, the power source wiring 110 may be removed from the right receptacle 112 and switched to the left receptacle 116. A receptacle plug 152 would be placed in the right receptacle 112 for safety and to protect the internal wiring 158. In another embodiment, when the power source wiring 110 is coupled to the left receptacle 116, a connecting wire 154 may be used in the right receptacle 112 to connect the light bar assembly 102 to additional light bar assemblies 102 in series. The other end of the connecting wire 154 would be connected to the receptacle of the adjacent light bar assembly 102. The left receptacle 116 works in a similar way, and may receive either the power source wiring 110, the connecting wiring 154, or the receptacle plug 152. The right end cap 108 is coupled to the center housing 104 with a plurality of end cap attachment screws 156. The left end cap 114 covers and seals the interior of the light bar assembly 102 on the left-hand side. The left end cap 114 also contains the left receptacle 116. The left receptacle 116 works in a similar way to the right receptacle 112, and may receive either the power source wiring 110, the connecting wiring 154, or the receptacle plug 152.

The mounting assembly 126 includes the adjustment bracket 128 that is coupled to the adjustment track 106 in the back of the center housing 104. The adjustment bracket 128 may be moved linearly along the entire length of the light bar assembly 102 to provide maximum adjustment. The bottom of the adjustment bracket 128 has an adjustment bracket hole 130 that is used to attach it to the clevis 132. The clevis is U-shaped, with the plurality of clevis holes 134, one in each side of the clevis. The pivot bolt 136 goes through one side of the clevis 132, through the adjustment bracket hole 130 and through the other side of the clevis 132, where is it secured with the pivot bolt washer 140 and the pivot bolt nut 138. At the bottom of the U-shaped base of the clevis 132 the threaded mounting bolt 142 extends vertically down from the base of the clevis 132. The mounting bolt is used to mount the light bar system 100 to a support. The mounting nut 146 and the mounting washer 144 are used to secure the mounting bolt 142 to the support. The adjustment bracket 128 pivots or rotates about the pivot bolt 136 location, allowing for the light bar assembly 102 to be adjusted to various angles relative to horizontal. The operation of the adjustment bracket 128 is described in more detail below. In addition, the adjustment bracket 128 may be reversed on the adjustment track 106 so that the bottom of the adjustment bracket 128 points upward. This allows for a greater range of support mounting options.

Figure 2:
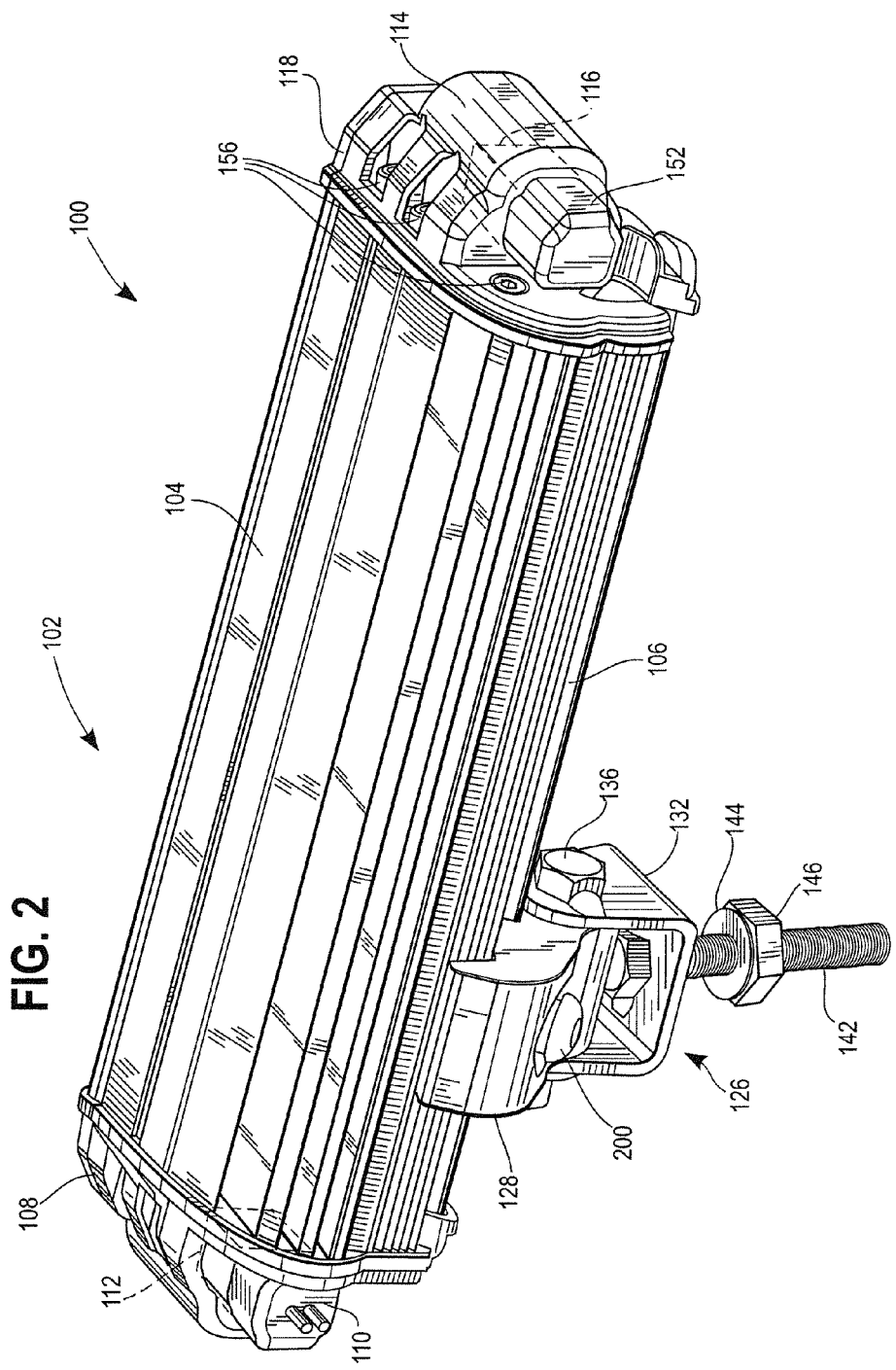
FIG. 2 is a perspective view of the rear of the light bar system.

Referring next to FIG. 2, a perspective view of the light bar system 100 is shown from the rear. Shown are the center housing 104, the front cap 118, the left end cap 114, the right end cap 108, a plurality of end cap attachment screws 156, the adjustment track 106, the adjustment bracket 128, an adjustment screw 200, the clevis 132, the pivot bolt 136, the mounting bolt 142, the mounting washer 144 and the mounting nut 146. In this embodiment the right receptacle 112 is shown with the power source wiring 110, and the left receptacle 116 is shown with the left receptacle plug 152.

Figure 3:
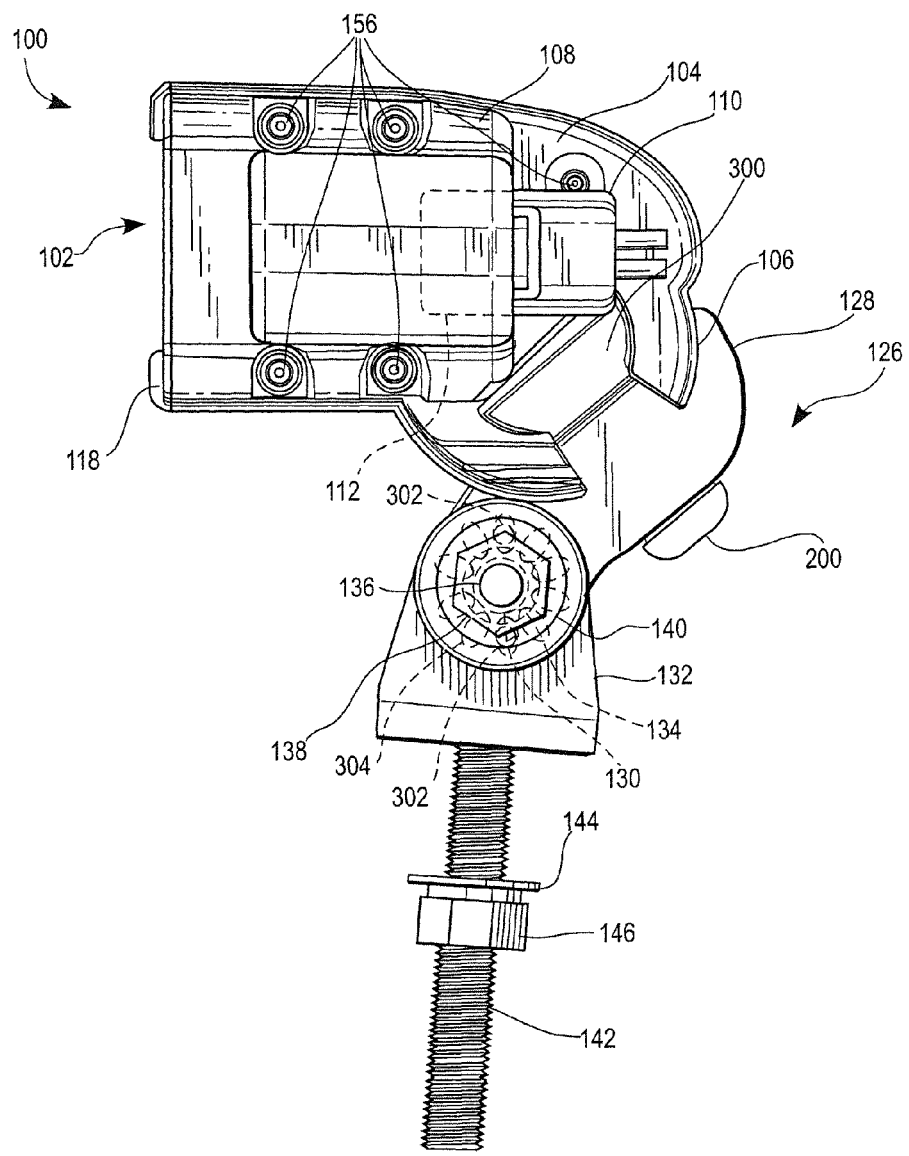
FIG. 3 is a side view of the light bar system.

Referring next to FIG. 3, an elevation of the right side of the light bar system 100 is shown. Shown are the front cap 118, the right end cap 108, the right receptacle 112, the power source wiring 110, the end cap adjustment screws 154, the center housing 104, an engagement block 300, the adjustment bracket 128, the adjustment bracket hole 130, the adjustment track 106, the adjustment screw 200, the clevis 132, the clevis hole 134, the pivot bolt 136, the pivot washer 140, the pivot nut 138, the mounting bolt 142, the mounting washer 144, the mounting nut 146, a plurality of pivot locking pins 302 and a plurality of pivot locking depressions 304. As described previously, the adjustment track 106 is formed by two continuous curved horizontal ridges protruding from the center housing 104. The adjustment bracket 128 fits tightly over each leg of the adjustment track 106 and extends partly into the adjustment track 106 at the open portion of the adjustment track 106. In the inside portion of the adjustment track 106, the trapezoidal engagement block 300 fits in the inside of the adjustment track 106 and is bolted to the adjustment bracket 128, locking the mounting assembly 126 in place along the adjustment track 106. When the adjustment screw 200 is loosened, the engagement block 300 separates slightly from the adjustment bracket 128, allowing the mounting assembly 126 to slide along the adjustment track 106. When the mounting assembly 126 is at the desired location, the adjustment screw 200 is tightened, causing friction between the adjustment track 106 and the adjustment bracket 128 and the engagement block 300, securing the mounting assembly 126 in place.

As described above, the adjustment bracket 128 pivots relative to the clevis 132 through use of the pivot bolt 136 which passes through both the plurality of clevis holes 134 and the adjustment bracket hole 130. The pivot washer 140 has the plurality of small pivot lock pins 302 which are coupled to the inside face of the pivot washer 140. In the preferred embodiment the pivot washer 140 has two pivot lock pins 302, located on opposite sides of the hole of the pivot washer 140. The pivot lock pins 302 extend through corresponding holes in the adjacent clevis 132 side and rest in the plurality of pivot locking depressions 304 of the adjustment bracket 128. The pivot locking depressions 304 are a plurality of shallow depressions in the adjustment bracket 128 arranged in a circular pattern around the adjustment bracket hole 130. The pivot locking depressions 304 are located so that the pivot lock pins 302 may sit in differing pivot locking depressions 304 depending on the rotation of the adjustment bracket 128 relative to the clevis 132. When the pivot bolt 136 is tightened, the pivot lock pins 302 are engaged by the corresponding pivot locking depressions 304 and the angle of the light bar assembly 102 is locked. When the pivot bolt 136 is loosened, the pivot washer 140 may be moved outward so that the pivot lock pins 302 clear the pivot locking depressions 304. The adjustment bracket 128 may then be rotated relative to the clevis 132 until the pivot lock pins 302 line up with alternate pivot locking depressions 304, altering the angle of the light bar assembly 102. When the desired angle is reached, the pivot bolt 136 is tightened, locking the angle of the light bar assembly 102.

Figure 4:
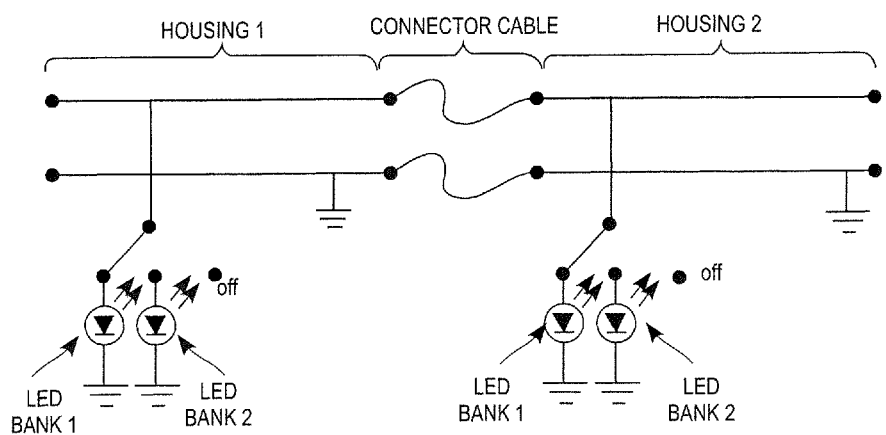
FIG. 4 is a schematic wiring diagram of in-series connection of light bar systems.

Referring next to FIG. 4, a schematic wiring diagram for in-series connecting of light bar assemblies is shown.

Figure 5:
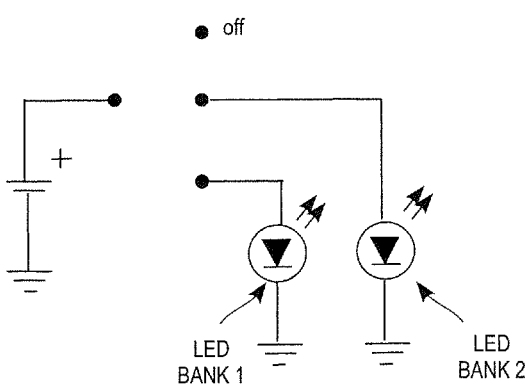
FIG. 5 is a schematic wiring diagram for a light combination system.

Referring next to FIG. 5, a schematic wiring diagram for a light combination is shown. In the embodiment where there are two rows of lighting. Each row may have a different color of LED lights 150. Instead of lighting both rows at the same time, the light combination circuit allows for one row of lights to be illuminated while the second row of light is not. This allows for different colors of light to be illuminated separately within the same light bar assembly 102.

While the invention herein disclosed has been described by means of specific embodiments, examples and applications thereof, numerous modifications and variations could be made thereto by those skilled in the art without departing from the scope of the invention set forth in the claims.

What is claimed is:

1. A vehicular lighting system housing comprising:
    an extrusion forming a first channel and a second channel;
    a lighting system in the first channel adapted to direct light away from the first channel;
    a mounting system in the second channel adapted to couple the extrusion to a vehicle;
    a first end cap including a first connector, the first end cap being coupled to a first end of the extrusion such that an interior of the housing is sealed; and
    a second end cap including a second connector, the second end cap being coupled to a second end of the extrusion such that the interior of the housing is sealed, wherein the first connector and the second connector are electrically coupled to one another, and wherein the first connector is configured to receive a first insert and, upon removal of the first insert, receive a second insert different from the first insert wherein the first insert and the second insert are each selected from the group consisting of power source wiring configured to connect the lighting system to a power source, connecting wiring configured to electrically connect the lighting system to another housing, and a receptacle plug configured to protect the lighting system, and wherein the second connector is configured to receive the first insert and, upon removal of the first insert, the second insert, whereby the first insert may be received by each of the first connector and the second connector, and the second insert may be received by each of the first connector and the second connector.

2. The vehicular lighting system housing of claim 1 wherein the lighting system includes a first light source and a second light source, wherein the first light source and the second light source are adapted to be independently switched on and off so that only the first light source, only the second light source or both the first light source and the second light source can be illuminated.

3. The vehicular lighting system housing of claim 2 wherein said lighting system comprises:
    a first reflector adapted to generate a first beam pattern; and
    a second reflector adapted to generate a second beam pattern;
    wherein said first reflector is adapted to reflect light from the first light source; and
    wherein said second reflector is adapted to reflect light from the second light source.

4. The vehicular lighting system housing of claim 1 wherein the first connector is coupled to a power source.

5. The vehicular lighting system housing of claim 4 wherein the second connector is connected to another lighting system in another housing.

6. The vehicular lighting system housing of claim 1 wherein said mounting system is rotatable about an axis of rotation outside said second channel over a range of at least 100 degrees.

7. The vehicular lighting system housing of claim 1 wherein the housing is a first housing and the second connector is coupled to a connecting wire received by the second connector, and further comprising:
    a second housing substantially equal to the first housing, wherein the connecting wire is received by a first connector of the second housing, whereby the first housing is electrically coupled to the second housing.

8. A vehicular lighting system comprising:
    a first housing comprising:
        a first lighting system;
        a first mounting system adapted for coupling the housing to a support;
        a first end cap coupled to a first end of the first housing such that an interior of the housing is sealed;
        a first connector coupled to the first end cap and configured to receive a first insert and, upon removal of the first insert, receive a second insert different from the first insert, wherein the first insert and the second insert are each selected from the group consisting of power source wiring configured to connect the lighting system to a power source, connecting wiring configured to electrically connect the lighting system to another housing, and a receptacle plug configured to protect the lighting system;
        a second end cap coupled to a second end of the first housing such that the interior of the housing is sealed;
        a second connector coupled to the second end cap and configured to receive the first insert and, upon removal of the first insert, the second insert, whereby the first insert may be received by each of the first connector and the second connector and the second insert may be received by each of the first connector and the second connector;

a second housing comprising:
a second lighting system;
a second mounting system adapted for coupling the housing to the support;
a third end cap coupled to a first end of the second housing;
a third connector coupled to the third end cap and configured to receive the first insert and, upon removal of the first insert, the second insert;
a fourth end cap coupled to a second end of the second housing;
a fourth connector coupled to the fourth end cap and configured to receive the first insert and, upon removal of the first insert, the second insert, whereby the first insert may be received by each of the third connector and the fourth connector and the second insert may be received by each of the third connector and the fourth connector; and
a connecting wire coupling the second connector to the third connector and received by the second connector and the third connector, whereby the first lighting system is electrically coupled to the second lighting system.

9. The vehicular lighting system of claim 8, wherein the second housing is connected to at least another lighting system in another housing.

10. The vehicular lighting system of claim 8 wherein the first connector is coupled to a power source.

11. The vehicular lighting system of claim 8 wherein the first housing is coupled to a first mounting system adapted to couple the first housing to a vehicle, and wherein the second housing is coupled to a second mounting system adapted to couple the second housing to a vehicle.

12. The vehicular lighting system of claim 11 wherein the first mounting system is rotatable about an axis of rotation relative to the first housing over a range of at least 100 degrees and wherein the second mounting system is rotatable about an axis of rotation relative to the second housing over a range of at least 100 degrees.

* * * * *

UNITED STATES PATENT AND TRADEMARK OFFICE
CERTIFICATE OF CORRECTION

PATENT NO.       : 8,974,102 B2                                                      Page 1 of 1
APPLICATION NO.  : 13/842411
DATED            : March 10, 2015
INVENTOR(S)      : Paine et al.

It is certified that error appears in the above-identified patent and that said Letters Patent is hereby corrected as shown below:

In the CLAIMS:
      Claim 1, column 5, line 62, delete "insert" and insert --insert,--.

Signed and Sealed this
Third Day of November, 2015

Michelle K. Lee
*Director of the United States Patent and Trademark Office*